(No Model.) 2 Sheets—Sheet 1.

J. GILMORE & W. R. CLARK.
CAR STARTER.

No. 376,875. Patented Jan. 24, 1888.

Witnesses:
Phil C. Dieterich
Joseph Barker

Inventors:
John Gilmore.
Wm. Richard Clark.
by
Thos. L. Ewin,
Attorney.

N. PETERS, Photo-Lithographer, Washington, D. C.

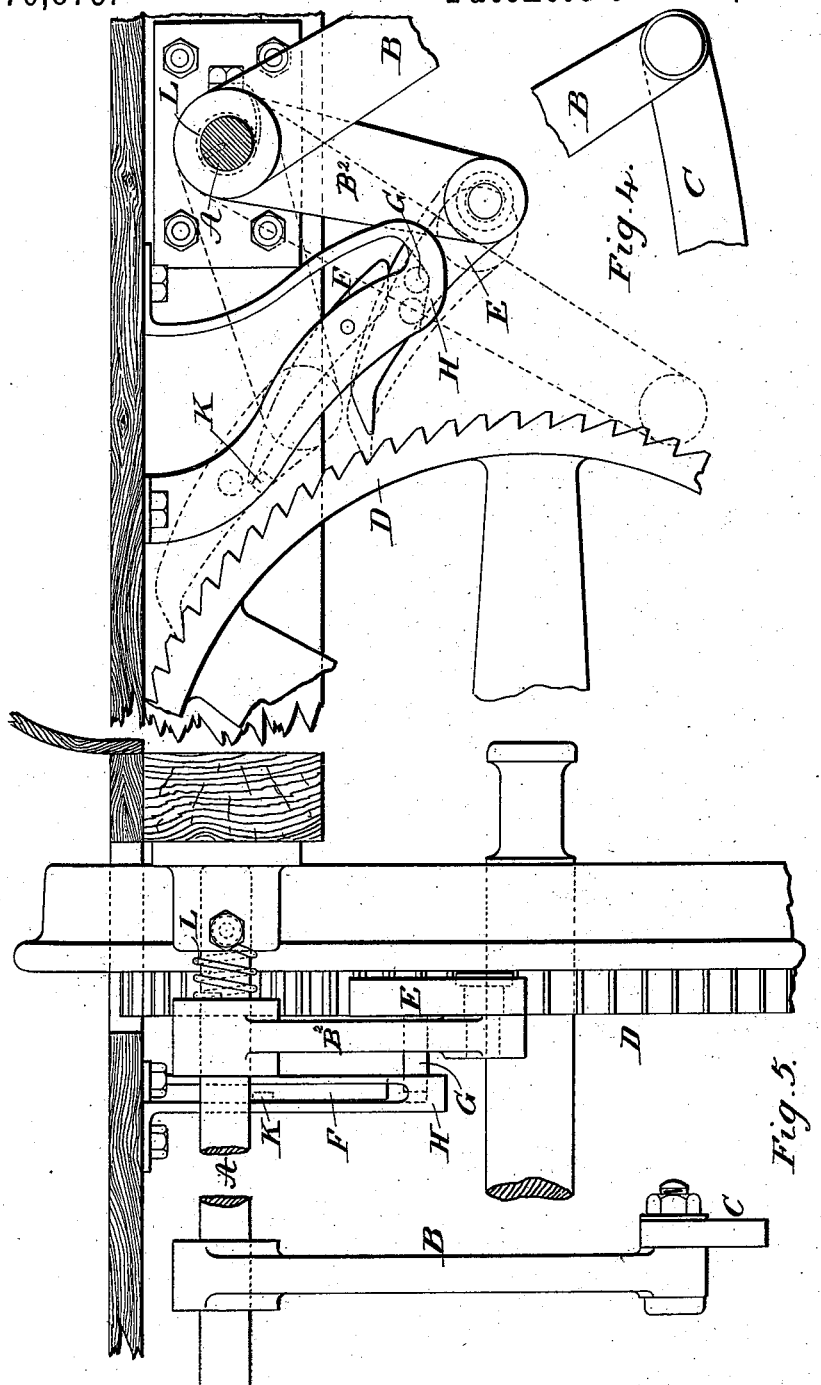

UNITED STATES PATENT OFFICE.

JOHN GILMORE AND WILLIAM RICHARD CLARK, OF LONDON, ENGLAND.

CAR-STARTER.

SPECIFICATION forming part of Letters Patent No. 376,875, dated January 24, 1888.

Application filed April 6, 1887. Serial No. 233,920. (No model.)

*To all whom it may concern:*

Be it known that we, JOHN GILMORE and WILLIAM RICHARD CLARK, subjects of the Queen of Great Britain, residing at London, England, have invented an Improved Starting Device for Tramway and other Vehicles, of which the following is a specification.

Our invention relates to an improved device to aid the starting of tramway and other vehicles where the *vis inertiæ* requires a heavy pull on the part of the horses to be overcome.

Our invention is designed to effect its object by the application of leverage to the wheel near the circumference, and therefore at a point of great advantage, and by the actual and initial pull of the horses, thus preventing any risk of the car running onto the horses. Peculiar means are provided for disengaging the pawl and ratchet preferably employed, so as to render the same noiseless; and "locking-gear" is combined therewith, so that the starting device shall only act when it is unlocked by the driver. Moreover, our device is of great simplicity.
In order that our invention may be the better understood, we now proceed to describe the same in relation to the drawings hereunto annexed, reference being had to the letters and figures marked thereon.
Like letters refer to like parts throughout the drawings.

Figure 1:
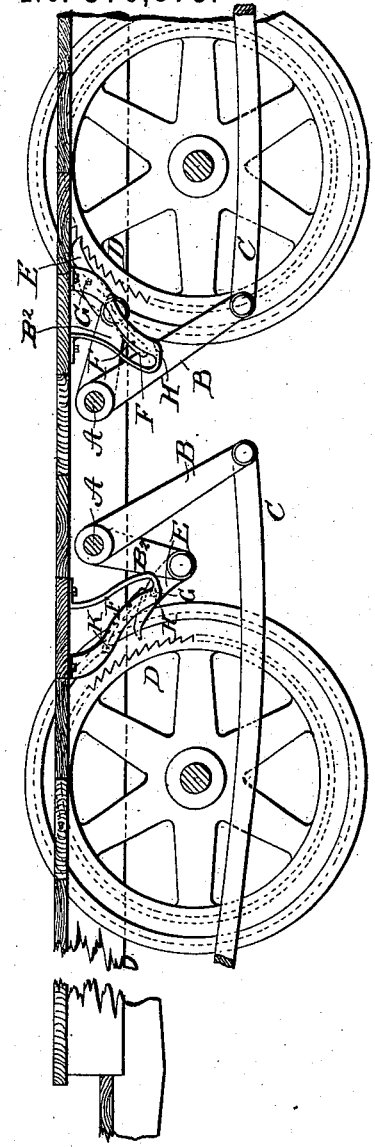
Figure 3:
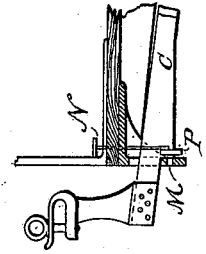
Figure 3:
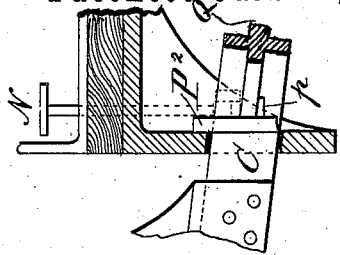
Figure 2:
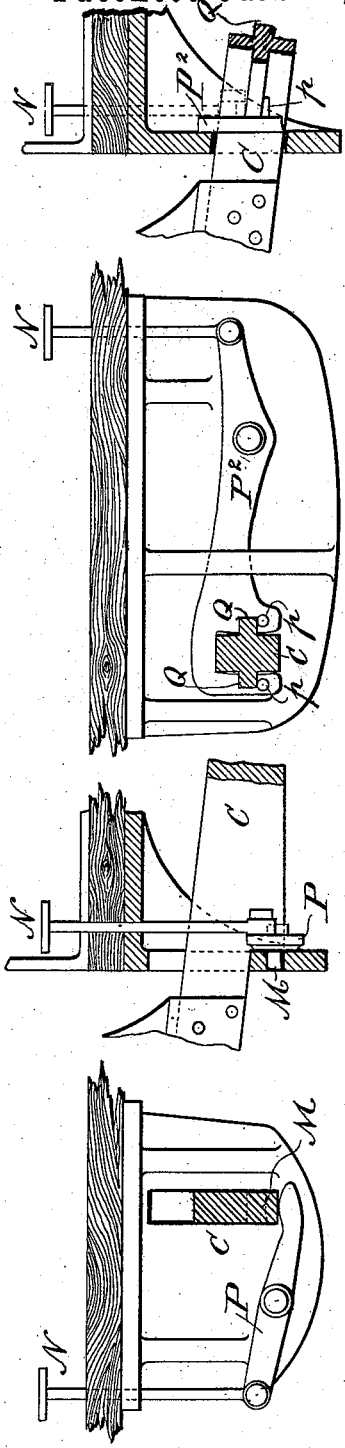

Figure 1 is a general elevation of our device as applied to the wheels of a tram-car. Fig. 2 is a side and front elevation of one proposed locking-gear. Fig. 3 is a side and front elevation of a modified locking-gear. Fig. 4 is a side elevation of the one set of the starting mechanism. Fig. 5 is a front elevation of the same.
Free to turn in the framing of the car and across the same, and to the rear of one or each of the axles, is a rock-shaft, A, which carries at its center a lever-arm, B, to the end of which is pivoted the corresponding draw-bar C of the vehicle. Where the vehicle is to be fitted for traction in either direction, duplicate mechanism is employed, as shown in Fig. 1, and each mechanism may preferably be applied to both wheels of the corresponding axle; but for clearness this detailed description will be confined to one mechanism and to its application to one wheel of the vehicle. It will be understood that the parts are duplicated to the requisite extent, with the customary modifications for right and left positions. Behind the wheel to be acted on a second lever-arm, $B^2$, is made fast on the rock-shaft A. At the inner circumference of the wheel, but clear of the tread, is attached a ratchet-wheel, D, or the ratchet-teeth are formed upon a shoulder of the wheel itself. Pivoted to the end of the arm $B^2$ is a pawl, E, which engages with a ratchet-tooth and gives it, as well as the whole wheel, an impulse at great advantage of leverage whenever the draw-bar is pulled at starting by the animal or animals drawing the vehicle. The pawl is hinged, and is caused to travel in a guide-bracket, H, Figs. 1, 4, and 5, by means of a guide-pin, G, and a pivoted cam-guide, F, so that the pawl will drop clear of the wheel when the draft ceases. This is conveniently effected as follows, (see Fig. 4:) When the pawl E makes its upward stroke, the pin G, which at the commencement of the stroke rests on a shoulder of the bracket H, passes upward at the under side of the pivoted cam-guide F. The pin G lifts the point of the pivoted cam-guide F, and when it has reached its extreme travel permits the guide-cam F to fall back onto its stop or rest K. Upon the return-stroke the pin G of the pawl E descends on the upper side of the cam-guide F, and thus the pawl is held clear of the ratchet-wheel. The mechanism is provided with a suitable spring, L, Figs. 4 and 5, either around the rock-shaft A, as shown, or at the extremity of the bar nearest the draft, to lessen the jerk of starting and to give spring-recoil to the draw-bar when the draft ceases. The draw-bar is further provided with a stop, M, Fig. 2, which causes the shouldered draw-bar to be locked against the framing or other suitable part, so as to prevent the ratchet-gear from coming into operation until the draw-bar is released. This may be effected by a foot-treadle, N, operating the lifting-lever P, and which may be worked at will by the treadle to lift the retracted draw-bar, so that the draw-bar may be released from its stop and the ratchet-gear come into operation. An equivalent but modified method is shown at Fig. 3, in which the draw-bar C is provided with side wings, Q Q, which are locked by a locking-bar, P², operated by the foot-treadle N, as before. When the draw-bar is back at its extreme travel, without draft upon it, the locking-bar P² may be raised, the pins thereon, p p, being then free from the projecting wings of the draw-bar. The draw-bar can then draw out to its fullest extent, and the ratchet-gear be thus brought into operation. Both these locking apparatus act automatically to lock the draw-bar when it has been returned to its extreme position without draft, until released by the driver. The locks cannot be released while draft is upon the draw-bar.

In place of a pawl, as before described, to engage the ratchet-wheel, a rack might be employed to engage at either the upper or the under side of a circular ratchet-wheel, the rack being connected to the draw-bar. This rack might be thrown in or out of gear by a treadle operated by the driver, as above described, or automatically by means of a spring or springs, or by a counterpoise arrangement, or by a suitable guide in which it might travel. We might modify the pawl into a toothed segment with several teeth, or we might make the bite a frictional bite, and thus dispense with teeth either on the pawl or wheel. Our device may be applied to both of a pair of wheels or to one only, and will be preferably fitted in duplicate when the vehicle is designed to be drawn in either direction, as before explained. (See Fig. 1.)

We do not claim, broadly, locating the ratchet-teeth on the carrying-wheels, as it has been before proposed to tooth the flanges of such wheels. Neither do we limit our claims to our preferred arrangement of the ratchet-teeth; and we disclaim as old the broad idea of keeping the pawls out of contact with the ratchet-teeth during the return movements of the pawls, as this has before been done in other ways. We also disclaim the broad idea of locking the draw-bar in one position, as it has been proposed to fasten the same by a drop-bolt in its extreme forward position.

Having now particularly described and ascertained the nature of our invention and in what manner the same is to be performed, we declare that what we claim is—

1. In a starting device for tramway and other vehicles, the combination, with a longitudinally-yielding draw-bar, of a rock-shaft having a lever-arm to which the draw-bar is pivoted and a lever-arm to which a pawl is directly pivoted, and a carrying-wheel provided with ratchet-teeth near its circumference, substantially as described, for the purpose set forth.

2. In a starting device for tramway or other vehicles, a guide-bracket provided with a pivoted cam-guide, in combination with a pawl having a stud-pin, and with a coacting ratchet-wheel, substantially as described, for the purpose set forth.

3. In a starting device for tramway and other vehicles, a draw-bar provided with a stop or stops which normally prevent its outward longitudinal movement, in combination with a part coacting with said stop or stops, and an unlocking device comprising a treadle convenient to the driver, the arrangement being such that the draw-bar may be unlocked at will in its innermost position, or may be left locked when the starting device is not required, substantially as described, for the purpose set forth.

In testimony whereof we have signed our names to this specification in the presence of two subscribing witnesses.

JOHN GILMORE.
WILLIAM RICHARD CLARK.

Witnesses:
SAM. P. WILDING,
RICHARD A. HOFFMANN.